(12) United States Patent
Kim

(10) Patent No.: US 7,073,270 B2
(45) Date of Patent: Jul. 11, 2006

(54) IMPACT-ABSORBING END CAPS FOR LEVELS

(75) Inventor: Charles D. Kim, Raleigh, NC (US)

(73) Assignee: Empire Level Mfg. Corp., Mukwonago, WI (US)

( * ) Notice: Subject to any disclaimer, the term of this patent is extended or adjusted under 35 U.S.C. 154(b) by 0 days.

(21) Appl. No.: 10/826,525

(22) Filed: Apr. 16, 2004

(65) Prior Publication Data

US 2005/0229414 A1    Oct. 20, 2005

(51) Int. Cl.
*G01C 9/10* (2006.01)
*G01C 9/24* (2006.01)

(52) U.S. Cl. ......................................... 33/451; 33/365
(58) Field of Classification Search .................. 33/451, 33/379, 377, 365, 755, 761, 771; 52/465, 52/309.3, 800.1

See application file for complete search history.

(56) References Cited

U.S. PATENT DOCUMENTS

| | | | | |
|---|---|---|---|---|
| 3,300,250 A * | 1/1967 | Dollgener et al. | ........ | 248/118.1 |
| 3,574,379 A * | 4/1971 | Jordan | ........................ | 293/109 |
| 3,921,306 A * | 11/1975 | Provi | ........................... | 33/379 |
| 4,346,205 A * | 8/1982 | Hiles | ............................ | 528/53 |
| 4,463,501 A * | 8/1984 | Wright et al. | ................. | 33/350 |
| 4,534,117 A * | 8/1985 | Haefner et al. | ............... | 33/379 |
| 4,710,984 A * | 12/1987 | Asper et al. | .................... | 2/412 |
| 4,979,310 A * | 12/1990 | Wright | .......................... | 33/379 |
| 4,991,303 A * | 2/1991 | Marth et al. | .................... | 33/379 |
| 5,143,359 A * | 9/1992 | Bush | ............................... | 269/6 |
| 5,165,650 A * | 11/1992 | Letizia | ....................... | 248/467 |
| 5,274,846 A * | 1/1994 | Kolsky | ........................... | 2/460 |
| 5,356,705 A * | 10/1994 | Kelch et al. | ................. | 428/332 |
| 5,363,631 A * | 11/1994 | Garrison | ......................... | 54/66 |
| 5,412,876 A * | 5/1995 | Scheyer | ........................ | 33/379 |
| 5,479,717 A * | 1/1996 | von Wedemeyer | ........... | 33/379 |
| 5,709,034 A * | 1/1998 | Kohner | ......................... | 33/377 |
| 5,940,978 A * | 8/1999 | Wright et al. | ................. | 33/381 |
| 5,980,143 A * | 11/1999 | Bayer et al. | ................. | 400/715 |
| 6,381,859 B1* | 5/2002 | Wedemeyer | ................. | 33/365 |
| 6,675,490 B1* | 1/2004 | Krehel et al. | ................. | 33/382 |
| 6,792,686 B1* | 9/2004 | Krehel et al. | ................. | 33/382 |
| 6,839,974 B1* | 1/2005 | Hitchcock | ..................... | 33/473 |
| 2003/0045376 A1* | 3/2003 | Dalton | ........................ | 473/367 |
| 2003/0145541 A1* | 8/2003 | Brightwell et al. | ........ | 52/309.3 |
| 2003/0163927 A1* | 9/2003 | Kallabis et al. | ............... | 33/365 |
| 2005/0155241 A1* | 7/2005 | Scheyer | ........................ | 33/379 |
| 2005/0229415 A1* | 10/2005 | Kim | ............................. | 33/451 |
| 2005/0229416 A1* | 10/2005 | Kim | ............................. | 33/451 |
| 2005/0229417 A1* | 10/2005 | Kim | ............................. | 33/451 |

* cited by examiner

*Primary Examiner*—Diego Gutierrez
*Assistant Examiner*—Amy R. Cohen
(74) *Attorney, Agent, or Firm*—Jansson, Shupe, Munger & Antaramian, Ltd.

(57) ABSTRACT

An impact-absorbing level is disclosed. The level comprises a body including a level face for measuring a surface, a vial mounted in the body at a predetermined angular relationship to the level face, and a first end cap fixed with respect to the first end, the first end cap comprising an outer layer and an intermediate layer, the intermediate layer fixed to the outer layer and having lower density than the outer layer, the intermediate layer positioned between the outer layer and the body, such that the first end cap absorbs impacts to the outer layer to prevent damage to the body. Also disclosed is a method of providing impact-absorption to a level in which a dual-density end cap is adhered to each end of the level.

17 Claims, 4 Drawing Sheets

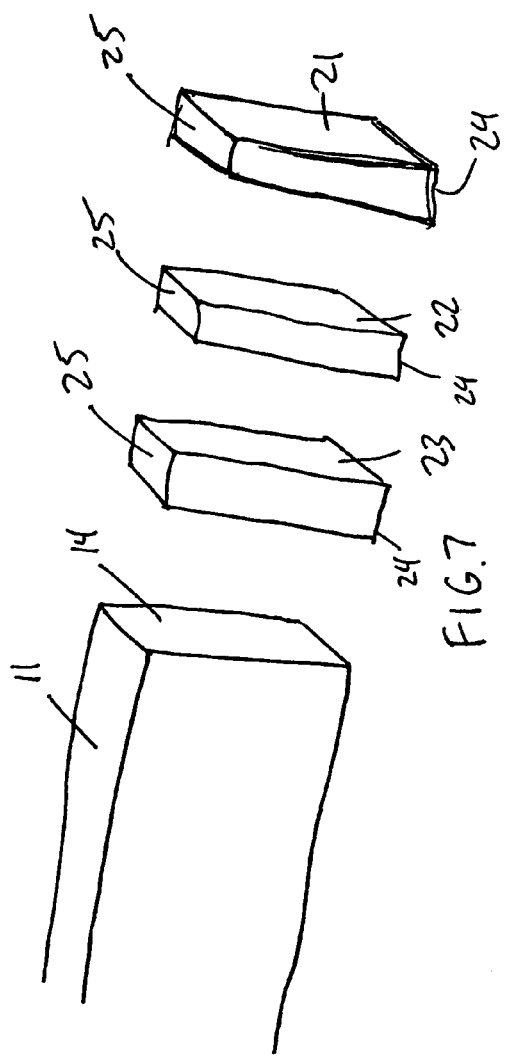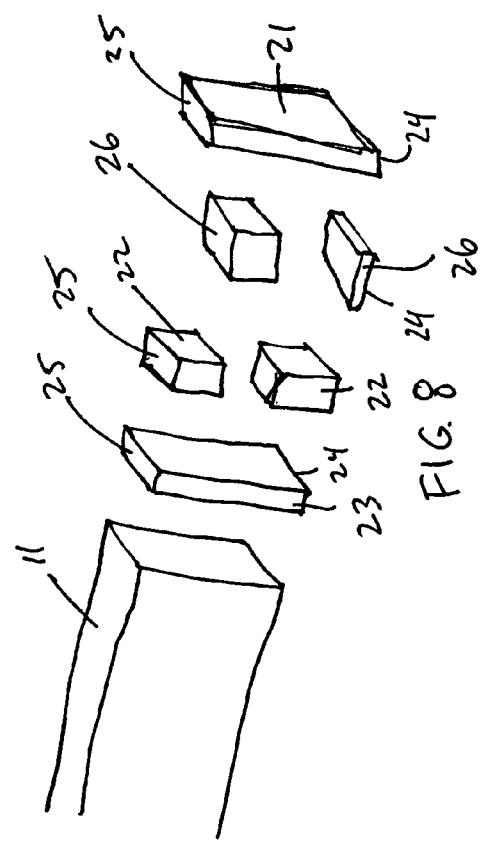

IMPACT-ABSORBING END CAPS FOR LEVELS

FIELD OF THE INVENTION

This invention relates to geometric instruments and, more particularly, to levels (sometimes referred to as "spirit levels" used by carpenters and the like.

BACKGROUND OF THE INVENTION

Levels are used by carpenters, masons, drywallers and the like for helping to assure that surfaces are horizontal, vertical, or at a specified angular relationship to the horizon. A typical level includes at least two vials, one each for ascertaining whether a surface is "level," i.e., horizontal, or "plumb," i.e., vertical.

A level comprises a measuring surface or surfaces and a vial set at an angular relationship to such surface(s). The vial is partially filled with a liquid such as mineral spirits. The vial is not completely filled and a bubble is thereby formed when the vial is closed. Typically, two marker rings are applied to the outside of the vial in positions to visually divide the cavity into three portions of about equal length. Level and plumb conditions are ascertained by noting the position of the bubble with respect to the marker rings.

A problem with such levels is that the vials and, to a lesser extent, the level's body can be damage easily during use. Levels are often left in position on a surface to be measured or set and can be knocked off causing them to fall to the ground. In addition, many levels have a greater length, frequently about four feet, and may be bumped or knocked by those who are more accustomed to dealing with tools of smaller dimensions. In addition, the great length of some levels causes an increase in weight which can add to stresses involved with falling or being bumped.

Therefore, there is a need to provide a device and method for reducing stress on level bodies and vials. Such a device and method would be an improvement upon the prior art. An improved level which includes impact-absorbing end caps to permit levels to withstand falls and bumps which typically cause damage to prior art level would solve the noted problems of the prior art.

OBJECTS OF THE INVENTION

It is an object of the invention to provide an improved level overcoming some of the problems and shortcomings of the prior art.

Another object of the invention is to provide a level which includes dual-density end caps which provide for impact absorption.

Another object of the invention is to provide a level which allows for compression of its end caps when impacted.

Another object of the invention is to provide a level which includes baffled end caps for to facilitate compression of its end caps when impacted.

Another object of the invention is to provide a level having ends which are protected from contact by foreign objects.

Yet another object of the invention is to provide a level having increase impact-resistance with little additional weight.

Another object of the invention is to provide a new method for making the new level.

Another object of the invention is to provide a new method which results in a level having coextensive end caps such that the profile of the end caps does not interfere during measurements. How these and other objects are accomplished will become apparent from the following descriptions and from the drawings.

SUMMARY OF THE INVENTION

In at least one embodiment, the invention is a level which provides for absorption of impacts to the level's ends. The invention represents a significant advance over the state of the art by providing novel elements, including a dual component end cap attached to the end of the level.

In certain embodiments, the impact-absorbing level comprises a body including a level face for measuring a surface, the body extending from a first end to a second end; at least one vial mounted in the body at a predetermined angular relationship to the level face; and a first end cap fixed with respect to the first end, the first end cap comprising an outer layer and an intermediate layer, the intermediate layer fixed to the outer layer and having lower density than the outer layer, the intermediate layer positioned between the outer layer and the body. In such a level, the first end cap absorbs impacts to the outer layer to prevent damage to the body.

The level may further includes a second end cap fixed with respect to the second end, the second end cap comprising an second outer layer and a second intermediate layer, the second intermediate layer fixed to the second outer layer and having lower density than the second outer layer, the second intermediate layer positioned between the second outer layer and the body. The second end cap absorbs impacts to the second outer layer to prevent damage to the body.

In some preferred embodiments, the outer layer has a higher density than the intermediate layer and is less compressed than the intermediate layer during an impact. In such embodiments, the outer layer may preferably be acrylonitrile butadiene styrene and the intermediate layer may preferably be thermoplastic rubber though other materials may be used. The outer layer and intermediate layer are preferably bonded together, either through adhesion resulting from heat processing, through use of an addition adhesive which is able to bond strongly to both the outer and intermediate layers, or through other methods.

Each end cap preferably further comprises an inner layer having a higher density than the intermediate layer, the inner layer connecting the intermediate layer to the body. In such embodiments, the outer layer is preferably acrylonitrile butadiene styrene, the intermediate layer is preferably thermoplastic rubber, and the inner layer is preferably acrylonitrile butadiene styrene. Again, such layers are preferably bonded together by heat processing, use of an additional adhesive which is able to bond strongly to each layer, or other methods.

In certain embodiments, the outer, intermediate and inner layers extend from a bottom surface to a top surface, the inner and outer layers are comprised of a first material and the end caps further include a web layer comprised of the first material and further connecting the inner and outer layers. Such a web layer may be integrally formed with the outer and/or inner layers and intersects the intermediate layer.

The body defines a body profile at its ends, the outer layer defines an outer profile which matches the body profile, the intermediate layer includes a baffled profile including portions matching the body profile and portions smaller than the body profile, and the inner layer defines an inner profile which matches the body profile and it bonded or adhered thereto such that each end cap is bonded or adhered to the body.

The invention can also be considered an improvement upon a level including (a) a body extending from a first end to a second end, (b) a level face connected with respect to the body, the level face for measuring a surface, and (c) a vial mounted with respect to the body at a predetermined angular relationship to the level face. Such improvement includes a first dual-density end cap mounted to the first end and a second dual-density end cap mounted to the second end, the end caps having an outer layer and an intermediate layer, whereby impacts to an end cap result in compression of the end cap and dissipation of the impact to prevent damage to the level.

In such an improvement, the intermediate layers preferably have lower densities than the outer layers and are compressed more easily than the outer layers. The outer layers may be acrylonitrile butadiene styrene and the intermediate layers may be thermoplastic rubber though other materials may be used to accomplish the impact-absorption function while providing for sufficient bonding between one another and to the body of the level. The end caps may further comprise inner layers connecting the intermediate layers to the body. The intermediate layers preferably have lower densities than both the inner and outer layers and are compressed more easily than both the inner and outer layers. It is preferred that the inner layers be acrylonitrile butadiene styrene.

In the improvement, the body of the level defines a body profile at the ends with the outer layers defining outer profiles which match the body profile, and the intermediate layers including baffled profiles having portions matching the body profile and portions smaller than the body profile. It is preferred that the outer layers be bonded to the intermediate layers, the intermediate layers be bonded to the inner layers, and the inner layers be bonded to the ends.

The invention also includes a method of providing impact-absorption to a level. Such a method comprises providing a level having a body defined by first and second ends; and adhering a dual-density end cap to each end, each end cap having an intermediate layer for connection with respect to a respective end and an outer layer for connection to a respective intermediate layer, the outer layer having an outer surface. In such a method, each end cap absorbs impacts to the respective outer surface by allowing the respective outer surface to be moved toward the respective end during the respective impact. Each end cap preferably includes an inner layer for connection to a respective end and to a respective intermediate layer. The intermediate layers preferably have lower densities than the outer layers and the intermediate layers are preferably compressed more than the outer layers during an impact.

BRIEF DESCRIPTION OF THE DRAWINGS

FIG. 7 is an exploded view of an end cap shown in FIG. 1.

FIG. 8 is an exploded view of an end cap shown in FIG. 2.

DETAILED DESCRIPTION OF PREFERRED EMBODIMENTS

Figure 1:
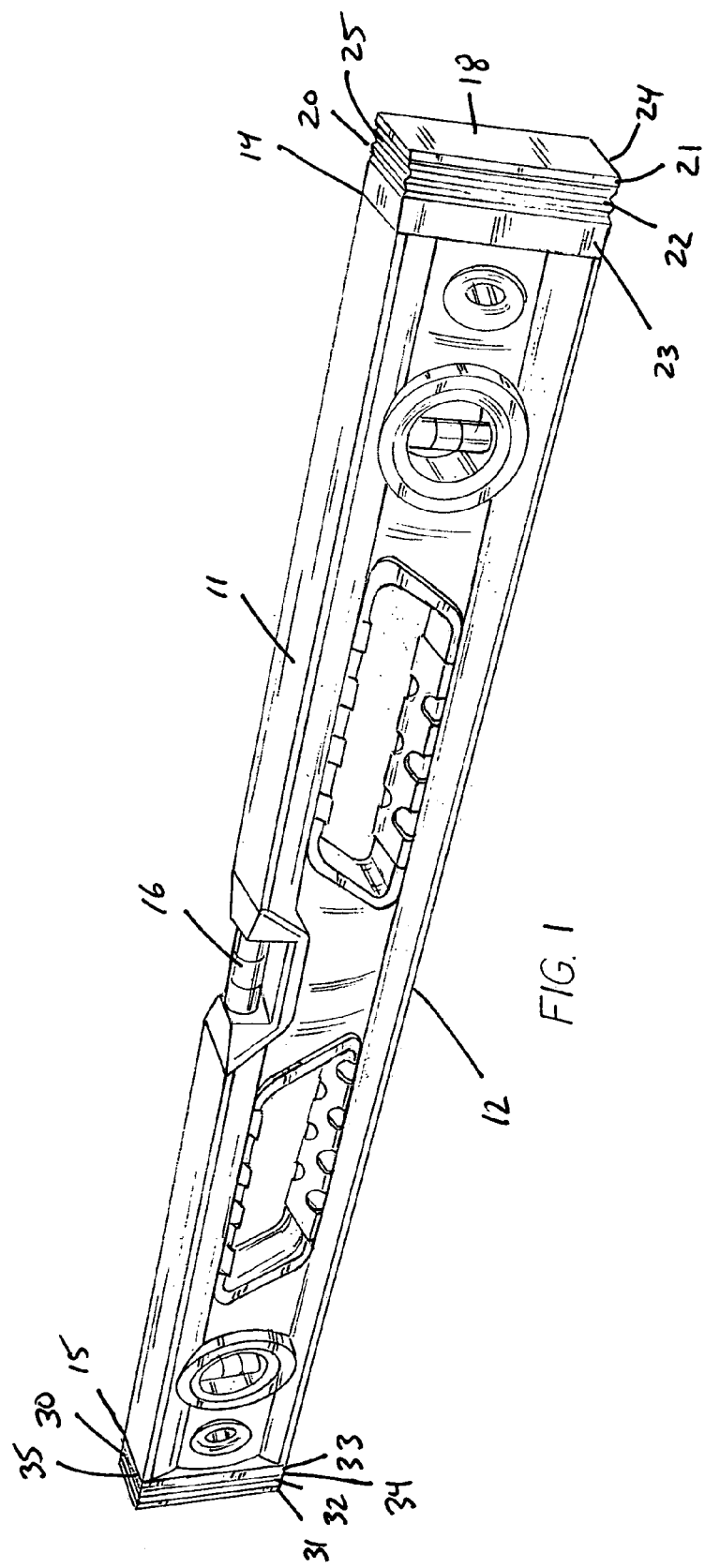
FIG. 1 is a perspective view of a level having impact-absorbing end caps in accordance with an embodiment of the invention.
Figure 2:
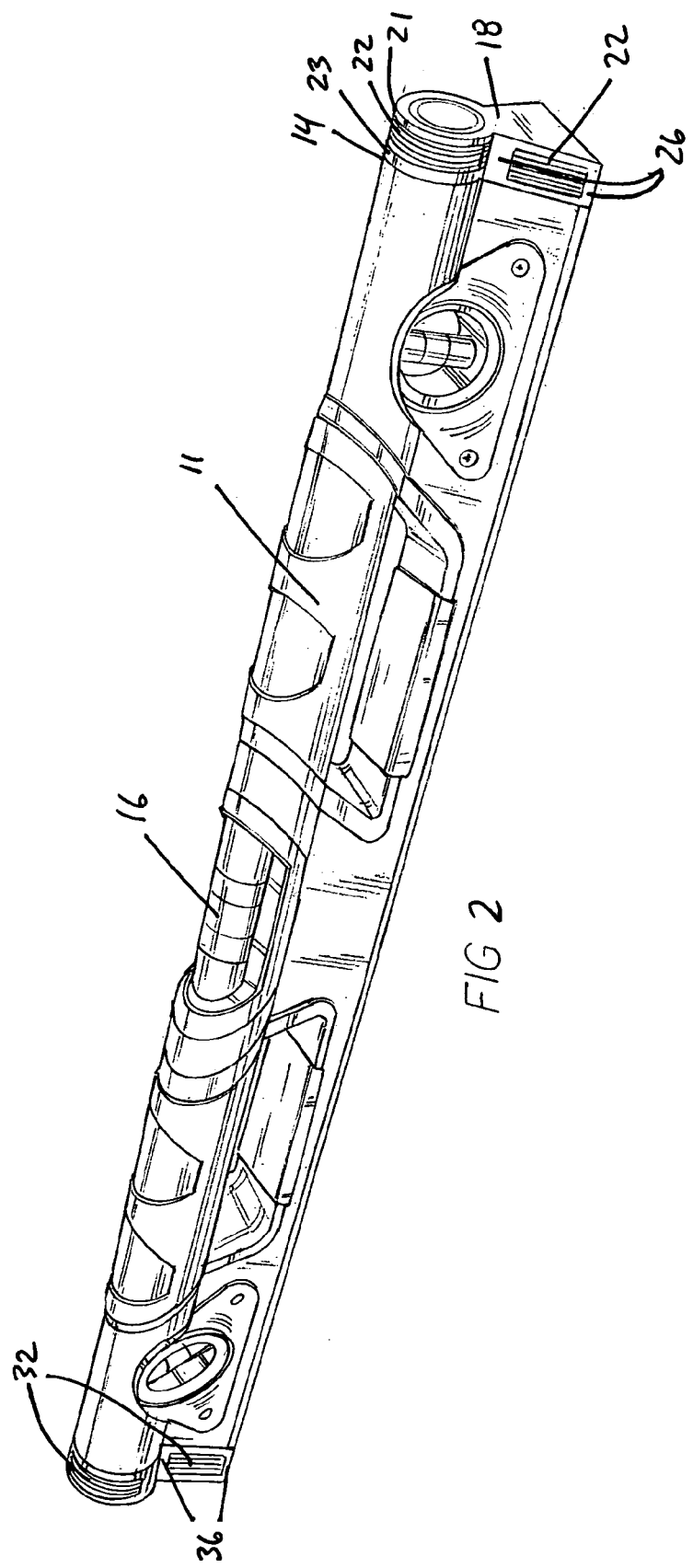
FIG. 2 is a perspective view of a level having impact-absorbing end caps in accordance with another embodiment of the invention.
Figure 3:
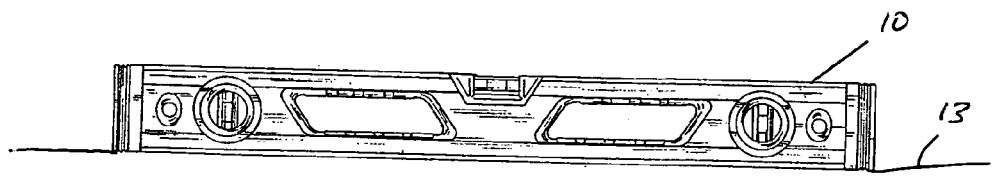
FIG. 3 is a front elevation of the level of FIG. 1 in contact with a surface to be measured.

FIGS. 1 and 2 are perspective views of alternate levels 10 having impact-absorbing end caps 20,30. Each level 10 includes a body 11 having a level face 12 for measuring a surface 13 (see FIG. 3), the body extending from a first end 14 to a second end 15. Each level 10 further includes at least one vial 16 mounted in body 11 at a predetermined angular relationship to level face 12, such as parallel to, perpendicular to, or at another specific angle to level face 12.

First dual-density end cap 20 is fixed with respect to first end 14 and comprises an outer layer 21, an intermediate layer 22, and an inner layer 23. Outer layer 21 is fixed or bonded to intermediate layer 22 which is fixed or bonded to inner layer 23. Intermediate layer 22 has a lower density than outer layer 21 and inner layer 23 such that intermediate layer is compressed more easily and to a greater degree during impacts. Outer and inner layers 21,23 are preferably acrylonitrile butadiene styrene and intermediate layer 22 is preferably thermoplastic rubber. When the level is dropped or the outer surface 18 of first end cap 20 otherwise strikes a surface, first end cap 20 is compressed such that the distance between at least a portion of outer layer 21 and the end 14 of level 10 is reduced. In this manner, first end cap 20 absorbs impacts to the outer layer 21 to prevent damage to the body 11.

Second dual-density end cap 30 is fixed with respect to second end 15 and comprises an outer layer 31 an intermediate layer 32, and an inner layer 33. Outer layer 31 is fixed or bonded to intermediate layer 32 which is fixed or bonded to inner layer 33. Intermediate layer 32 has a lower density than outer layer 31 and inner layer 33 such that intermediate layer is compressed more easily and to a greater extent during impacts. Outer and inner layers 31,33 are preferably acrylonitrile butadiene styrene and intermediate layer 32 is preferably thermoplastic rubber. When the level is dropped or the outer surface 37 of second end cap 30 otherwise strikes a surface, second end cap 30 is compressed such that the distance between at least a portion of outer layer 31 and the end 15 of level 10 is reduced. In this manner, second end cap 30 absorbs impacts to the outer layer 31 to prevent damage to the body 11.

In FIGS. 1 and 2 the outer layers 21,31, intermediate layers 22,32, and inner layers 23,33 extend from a bottom surface 24,34 to a top surface 25,34. In FIG. 2, each end cap 20,30 further includes a web layer 26,36 further connecting outer layers 21,31 and inner layers 23,33. Web layer 26,36 is preferably comprised of the same material as outer layers 21,31 and inner layers 23,33 and may be integrally formed with both or either of those layers.

Figure 4:
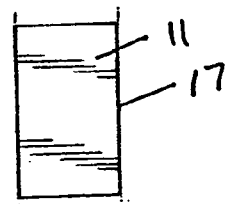
FIG. 4 is an end view of an end of the body of the level in accordance with the principles of an embodiment of the present invention.
Figure 5:
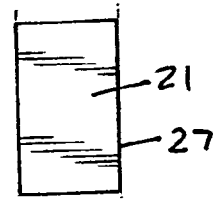
FIG. 5 is an end view of the outer surface of the outer layer of an end cap in accordance with the principles of an embodiment of the present invention.
Figure 6:
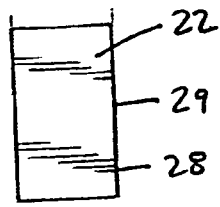
FIG. 6 is a cross section view of portions of the intermediate layer in accordance with the principles of an embodiment of the present invention.
Figure 6:
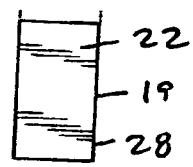

FIGS. 4, 5, and 6 show the profiles of various level components. FIG. 4 is a cross section view of the level body 11 near an end 14,15 and shows body profile 17 as having a rectangular shape with an area. FIG. 5 is a cross section of outer layer 21 and shows outer profile 27 matching body profile 17, that is, it has the same rectangular shape and area as body profile 17. FIG. 6 shows two cross section views of baffled intermediate layer 22 having intermediate profile 28. In its expanded portion 29 shown on the left, intermediate profile 28 matches body profile 17 and outer profile 27. In its reduced portion 19 shown on the right, intermediate profile 28 has a smaller area than body profile 17 and outer profile 27. Such a design aids compression of intermediate layer 22 during impacts. In addition, because the outer, intermediate, and inner layers 21,22,23 include no profiles greater than the body profile 17, end caps 20,30 never interfere with level measurements performed by level 10.

FIGS. 7 and 8 are exploded view of first dual-density end caps 20 shown in FIGS. 1 and 2. FIG. 8 shows the inclusion of web layer 26 which may comprise two separate portions as shown. Web layer 26 may be integrally formed with either or both outer layer 21 or inner layer 23 or may be a separate piece bonded to each of the layers 21,22,23.

Thus, it should be apparent that there has been provided, in accordance with the present invention, a vial for use with levels that fully satisfies the objectives and advantages set forth above.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An impact-absorbing level compnsmg:
  a body including a level face for measuring a surface, the body extending from a first end to a second end and having an outside contour at each end defining a body profile;
  at least one vial mounted in the body at a predetermined angular relationship to the level face; and
  at least one end cap fixed with respect to at least one end, the end cap comprising an impact-resisting outer layer and an impact-compressing intermediate layer, the outer layer having an outside contour congruent to the body profile, the intermediate layer defining a rippled profile and having portions with an outside contour congruent to the body profile spaced apart by portions with an outside contour smaller and geometrically similar to the body profile, the intermediate layer fixed to the outer layer and having lower density than the outer layet, the intermediate layer positioned between the outer layer and the body;
  whereby the first end cap absorbs impacts to the outer layer to prevent damage to the body.

2. The level of claim 1 wherein the at least one end cap comprises two end caps fixed with respect to the first and second ends respectively.

3. The level of claim 1 wherein the outer layer is acrylonitrile butadiene styrene and the intermediate layer is thermoplastic rubber.

4. The level of claim 1 wherein the first end cdp further comprises an impact-resisting inner layer having a higher density than the intetmediate layer, the inner layer connecting the intermediate layer to the body.

5. The level of claim 1 wherein the end cap is adhered to the body.

6. The level of claim 1 wherein each layer has at least one outer surface coplanar with the level face.

7. In a level of the type having (a) a body extending from a first end to a second end, (b) a level face connected with respect to the body, the level face for measuring a surface, and (c) a vial mounted with respect to the body at a predetermnied angular relationship to the level face, the improvement comprising a first dual-density end cap mounted to each end wherein each end cap has an outer layer, an intermediate layer contiguous with the outer layer, and an inner layer connecting the intermediate layer to the body, the outer layer being positioned most distal from the respective end and the intermediate layer having lower density than the outer and inner layers, whereby impact to the outer layer results in compression of the intermediate layer and dissipation of the impact to prevenij damage to the level.

8. The level of claim 7 wherein the outer layet is acrylonitrile butadiene styrene, the intermediate layer is thermoplastic rubber, and the innermediate layer is acrylonitrile butadiene styrene.

9. The level of claim 7 wherein the intermediate layers compress more easily than the inner and outer layers.

10. The level of claim 7 wherein the body has an outside contour at each end defining a body profile, the outer layers having an outside contour congruent to the body profile, and the intermediate layers define rippled profiles, the intermediate layers including portions with an outside contour congruent to the body profile spaced apart by portions with an outside contour smaller and geometrically similar to the body profile.

11. The level of claim 7 wherein the outer layer is bonded to the intermediate layer, the intermediate layer is bonded to the inner layer, and the inner layer is bonded to the respective end for each end cap.

12. The level of claim 7 wherein each end cap extends outward from the respective end to the outer layer and the layers are in longitudinal alignment, the outer layer being spaced apart from and non-contiguous with the inner layer.

13. The level of claim 7 wherein each layer is monolithic.

14. A method of providing impact-absorption to a level, the method comprising:
  providing a level having a body defined by first and second ends, the body including a level face for measuring a surface and having an outside contour at each end;
  adhering a dual-density end cap to each end, each end cap extending outward from the respective end within the contour thereof and having an intermediate layer connected with respect to the respective end and an outer layer secured to the intermediate layer and spaced apart from the end thereby, each layer having at least one outer surface coplanar with the level face, the outer layer having a greater density than the intermediate layer,
whereby each end cap absorbs impacts by allowing the respective outer layer to resist the impact by moving toward the respective end during the impact through compression of the respective intermediate layer.

15. The method of claim 14 wherein each end cap further includes an inner layer abutting the respective end, the intermediate layer being spaced apart from the body by the inner layer and the outer layer being spaced apart from the inner layer by the intermediate layer.

16. The method of claim 15 wherein the intermediate layers have lower densities than the inner layers and the intermediate layers compress more than the inner layers during an impact.

17. An impact-absorbing level comprising:
  a body including a level face for measuring a surface, the body extending from a first end to a second end;

at least one vial mounted in the body at a predetermined angular relationship to the level face; and a first end cap fixed with respect to the first end, the first end cap comprising an outer layer, an intermediate layer, a web layer and an inner layer, the outer, web and inner layers being comprised of a first material and the intermediate layer being comprised of a second material having lower density than the first material, the intermediate and web layers being positioned between the outer and inner layers and connecting the outer layer to the inner layer, and the inner layer connecting the intermediate and web layers to the body;

whereby the first end cap absorbs impacts to the outer layer to prevent damage to the body.

* * * * *

UNITED STATES PATENT AND TRADEMARK OFFICE
CERTIFICATE OF CORRECTION

PATENT NO. : 7,073,270 B2  Page 1 of 1
APPLICATION NO. : 10/826525
DATED : July 11, 2006
INVENTOR(S) : Charles D. Kim It is certified that error appears in the above-identified patent and that said Letters Patent is hereby corrected as shown below:

In Column 5, line 31, delete the word "compnsmg" and add the word --comprising--.
In Column 5, line 32, delete the word "inclading" and add the word --including--.
In Column 5, line 48, delete the word "layet" and add the word --layer--.
In Column 5, line 58, delete the word "cdp" and add the word --cap--.
In Column 6, line 4, delete the word "first" before the words "dual-density".
In Column 6, line 12, delete the word "preenij" and add the word --prevent--.
In Column 6, line 14, delete the word "layet" and add the word --layer--.
In Column 6, line 16, delete the word "innermediate" and add the word --intermediate--.

Signed and Sealed this

Fourteenth Day of November, 2006

JON W. DUDAS
*Director of the United States Patent and Trademark Office*